May 15, 1956

P. FISHER 2,745,503

STABILIZING BEAM CONNECTION BETWEEN
CRAWLERS AND TRACTOR FRAME

Filed May 1, 1950

INVENTOR.
Peter Fisher
BY
ATTORNEY

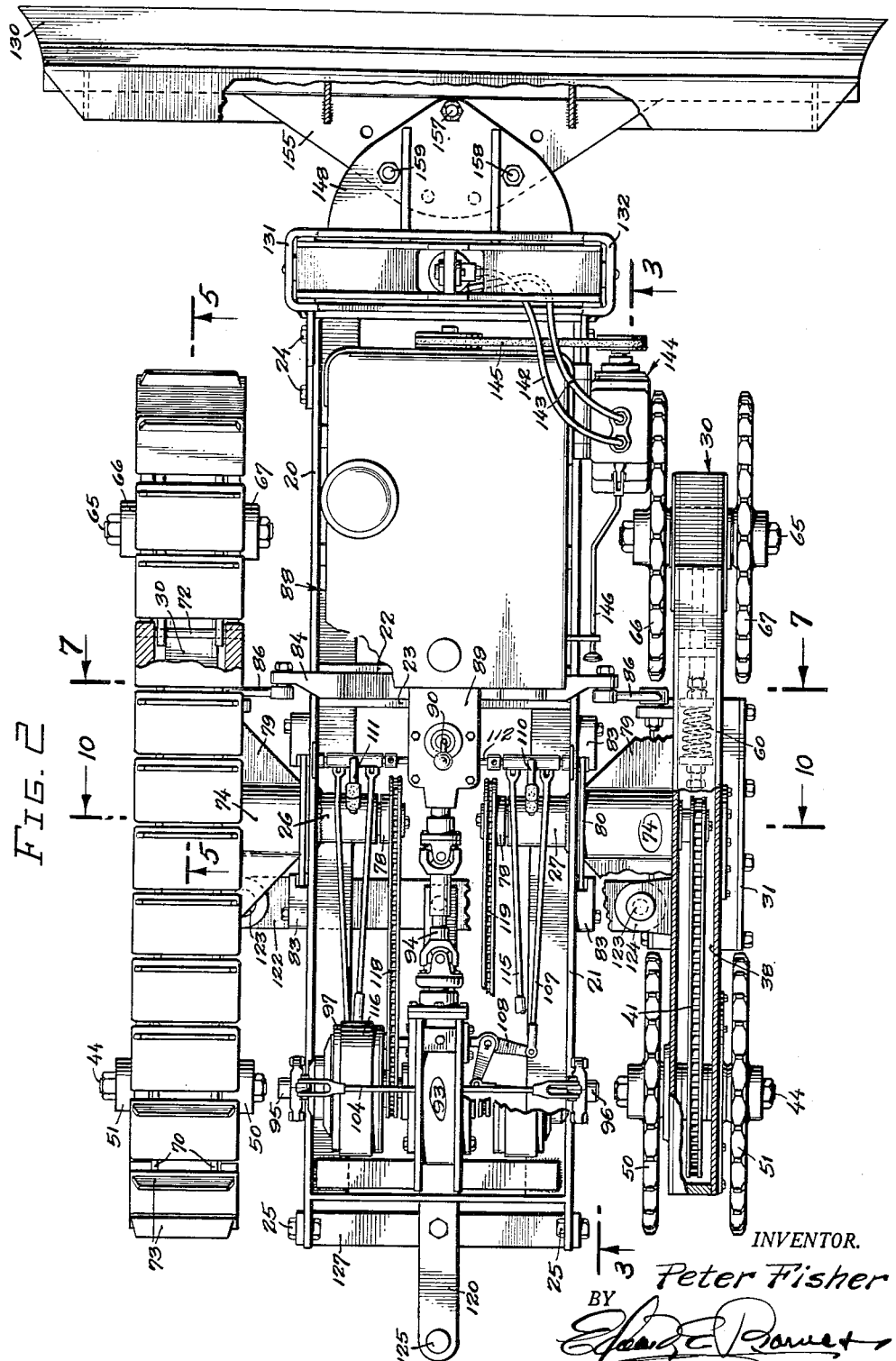

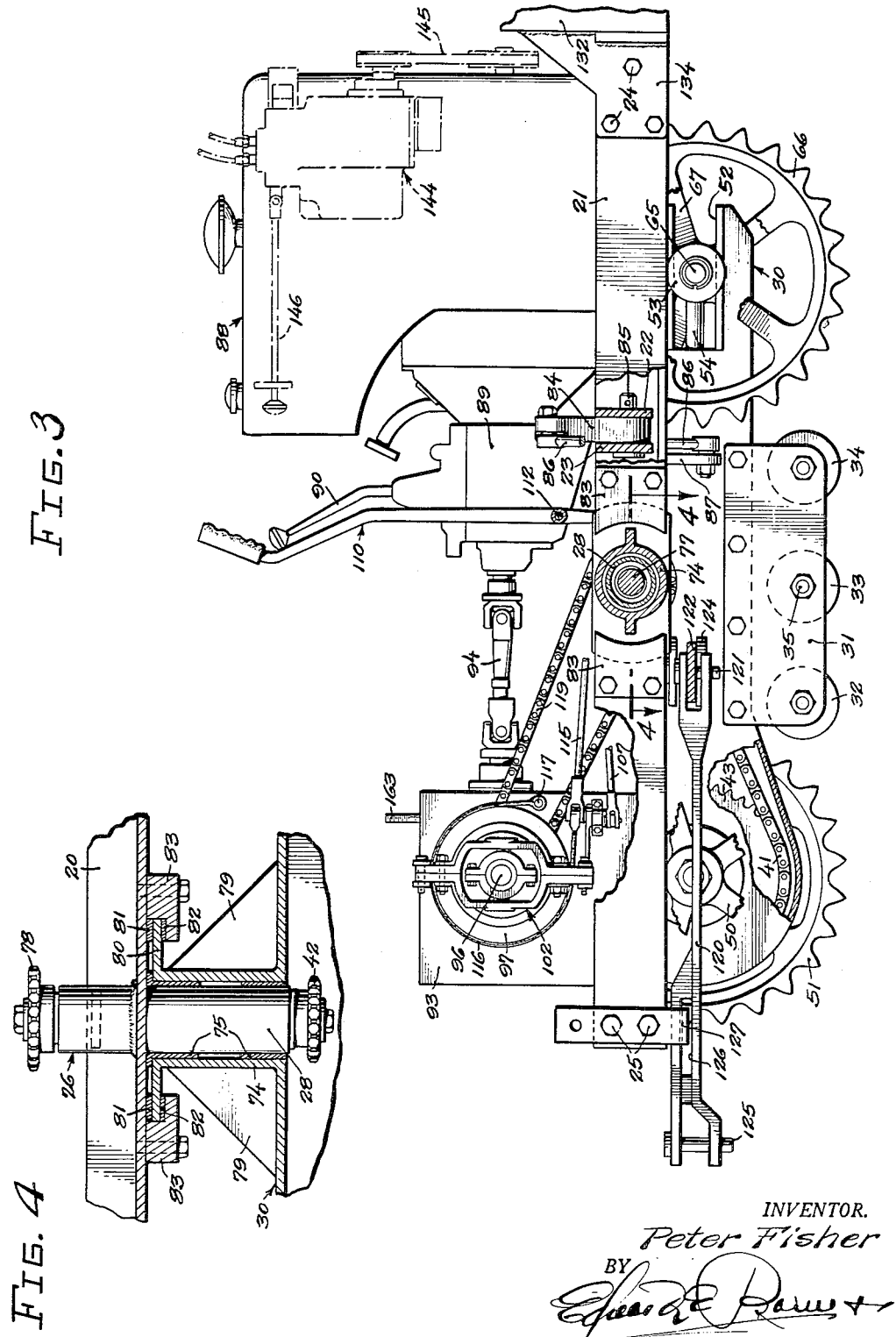

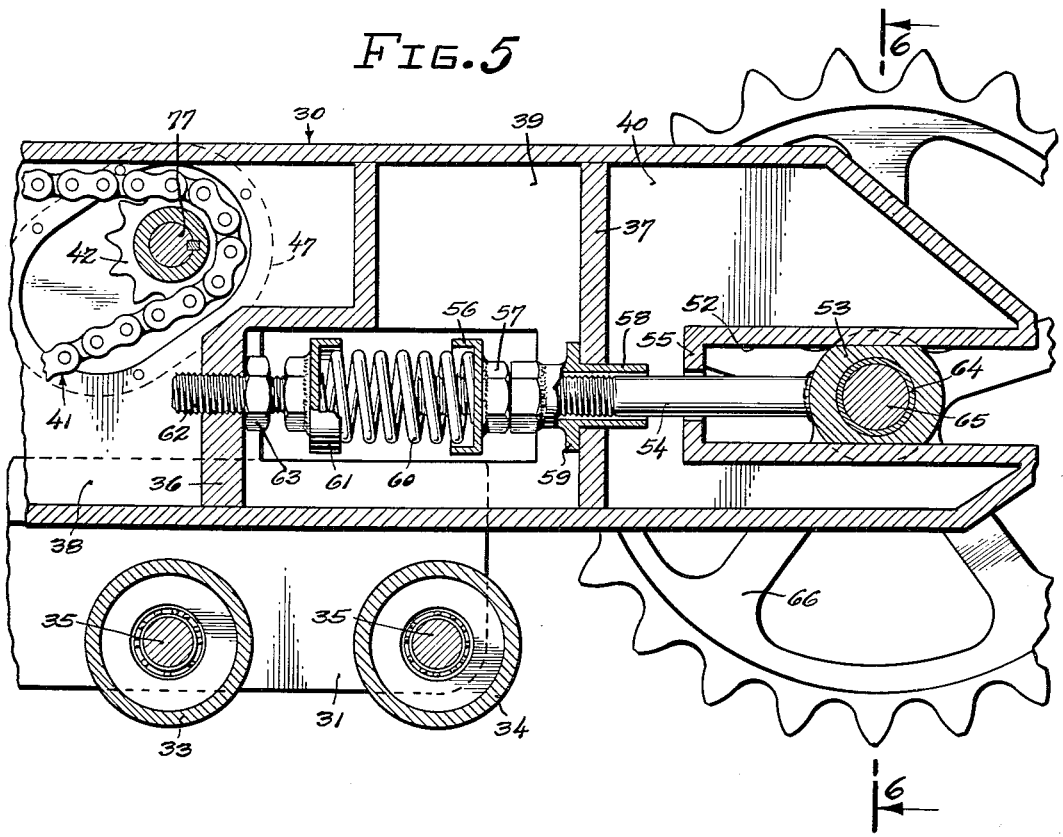
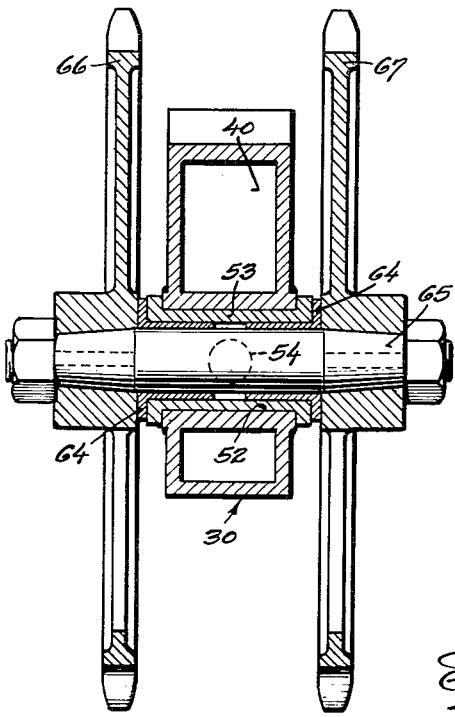

INVENTOR.
Peter Fisher
BY
ATTORNEY

May 15, 1956

P. FISHER 2,745,503

STABILIZING BEAM CONNECTION BETWEEN
CRAWLERS AND TRACTOR FRAME

Filed May 1, 1950

INVENTOR.
Peter Fisher
BY
ATTORNEY

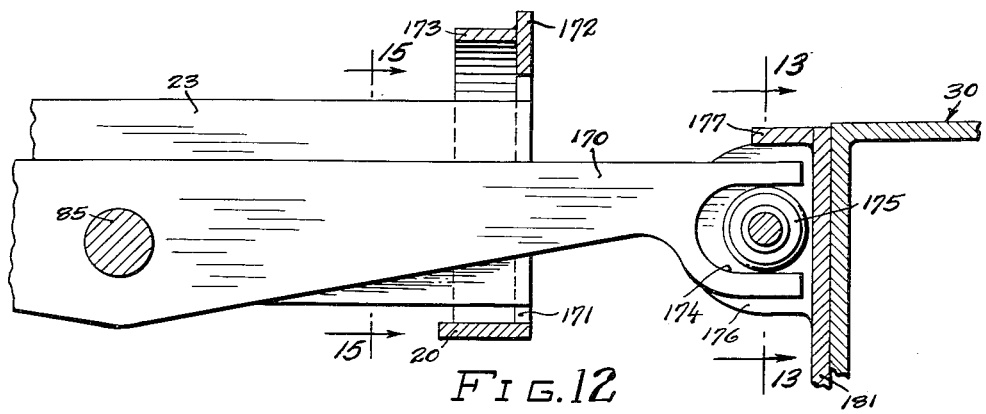
FIG.12
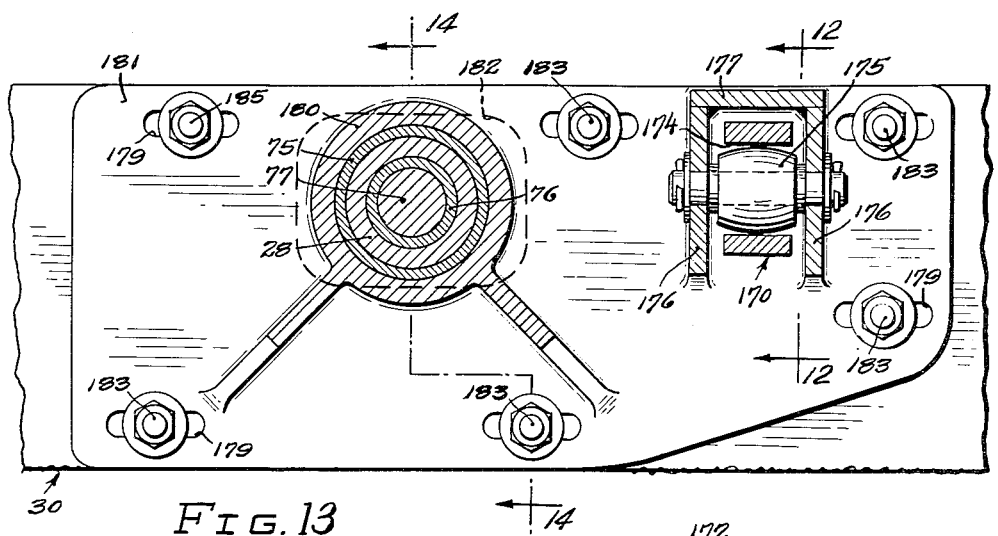
FIG.13
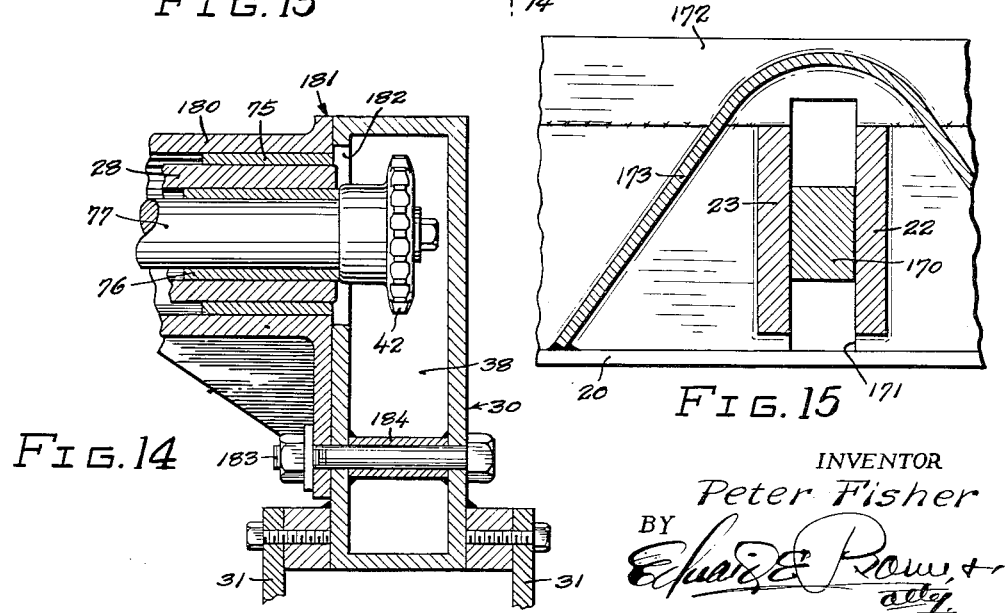
FIG.14
FIG.15
INVENTOR
Peter Fisher
BY
Edward E. Brown
atty

United States Patent Office 2,745,503
Patented May 15, 1956

2,745,503

STABILIZING BEAM CONNECTION BETWEEN CRAWLERS AND TRACTOR FRAME

Peter Fisher, North Vancouver, British Columbia, Canada, assignor of one-third to William Blaylock Steele and one-third to Lloyd Thurman Graves, both of North Vancouver, British Columbia, Canada Application May 1, 1950, Serial No. 159,311

4 Claims. (Cl. 180—9.1)

This invention relates to tractors, and while some features of the invention might be engineered to advantage into either a wheeled or a crawler-type tractor the major improvements are such as lend themselves to use more especially with tractors having "self-laying" or crawler type tracks and it is this class of tractor to which the present invention more particularly pertains.

One general object of my invention is to devise a tractor which will assure utmost efficiency where the same is being worked over uneven ground, and in the attainment of this object aims to provide a machine in which frames for the crawler tracks, pivoted at a point central to their length for free oscillatory movement to a main frame lying therebetween, are augmented by an unusually simple and effective walking-beam stabilizer which divides the relative vertical movement of the crawler frames and imparts from these crawler frames to the main frame only a mean of the opposing extremes. Ancillary to this general object, the invention further aims to devise a structure of this nature in which independently driven jack-shafts for each of the two crawler tracks function within but are independent of the pivot bearings for the crawler tracks, and in which these pivot bearings are self-sufficient to maintain parallelity or alignment of the crawler frames. As a yet additional aim, likewise ancillary to this general object, the invention purposes to provide a tractor which will obviate transfer of destructive stresses from the crawler frames to the walking-beam, which requires a minimum number of parts in establishing the stabilizing couple between the crawler frames and the main frame, and which places the entire stabilizing hook-up in such a position as will protect the same against liability of damage in the working of the tractor.

With these and still other objects and advantages in view, and which will appear and be understood in the course of the following description and claims, the invention consists in the novel construction and in the adaptation and combination of parts hereinafter described and claimed.

In the accompanying drawings:

Fig. 2 is a top plan view thereof with parts broken away and shown in section, with the near crawler chain deleted, and with the protective cover for the power-transmission system removed.

Fig. 3 is a fragmentary longitudinal vertical section on line 3—3 of Fig. 2.

Fig. 4 is a fragmentary horizontal sectional view drawn to an enlarged scale on line 4—4 of Fig. 3.

Fig. 5 is a fragmentary longitudinal vertical section drawn to an enlarged scale on line 5—5 of Fig. 2, deleting the crawler track.

Fig. 6 is a transverse vertical section on line 6—6 of Fig. 5.

Figure 1:
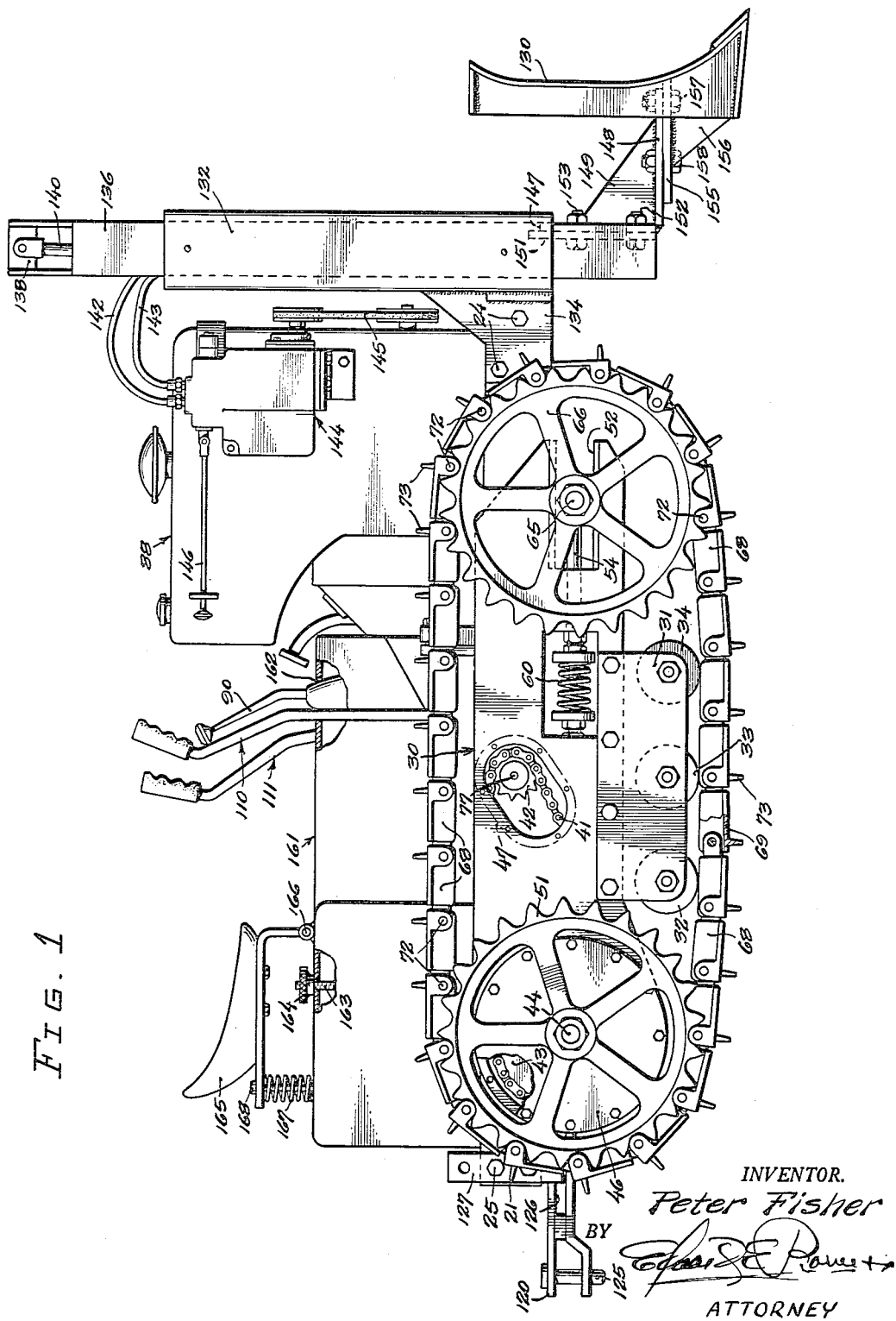
Figure 1 is a side elevation view showing a tractor constructed in accordance with the now preferred teachings of the present invention, parts being broken away to portray a portion of one end of the transfer chain which is housed in the near crawler frame and with an inspection plate removed to also portray the other end of said transfer chain.
Figure 7:
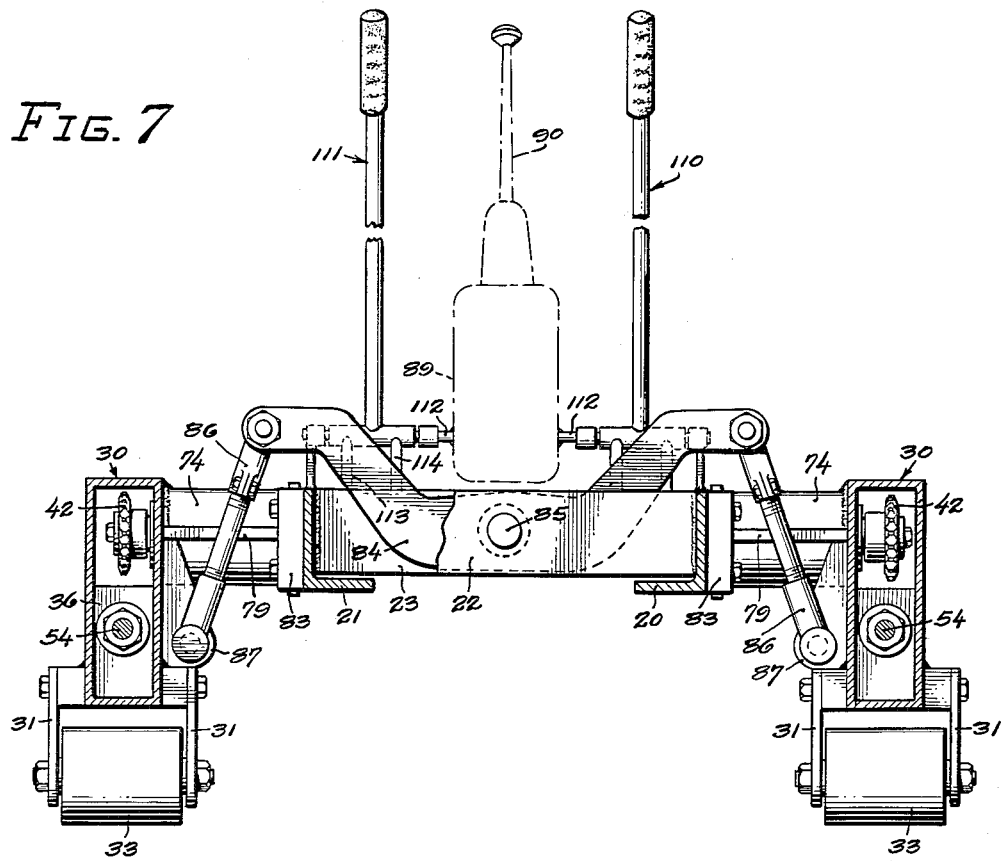
Fig. 7 is a transverse vertical section on line 7—7 of Fig. 2, with the crawler track removed.
Figure 8:
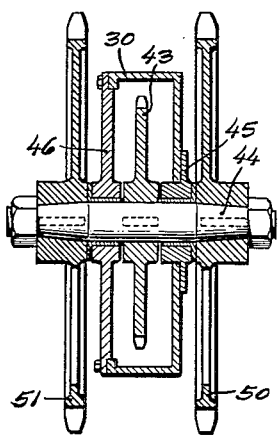
Fig. 8 is a transverse vertical section taken through the drive axle provided for each crawler assembly.
Figure 9:
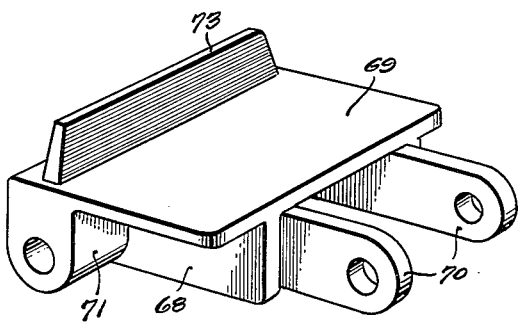
Fig. 9 is a perspective large-scale view portraying one of the component links of the crawler track.
Figure 10:
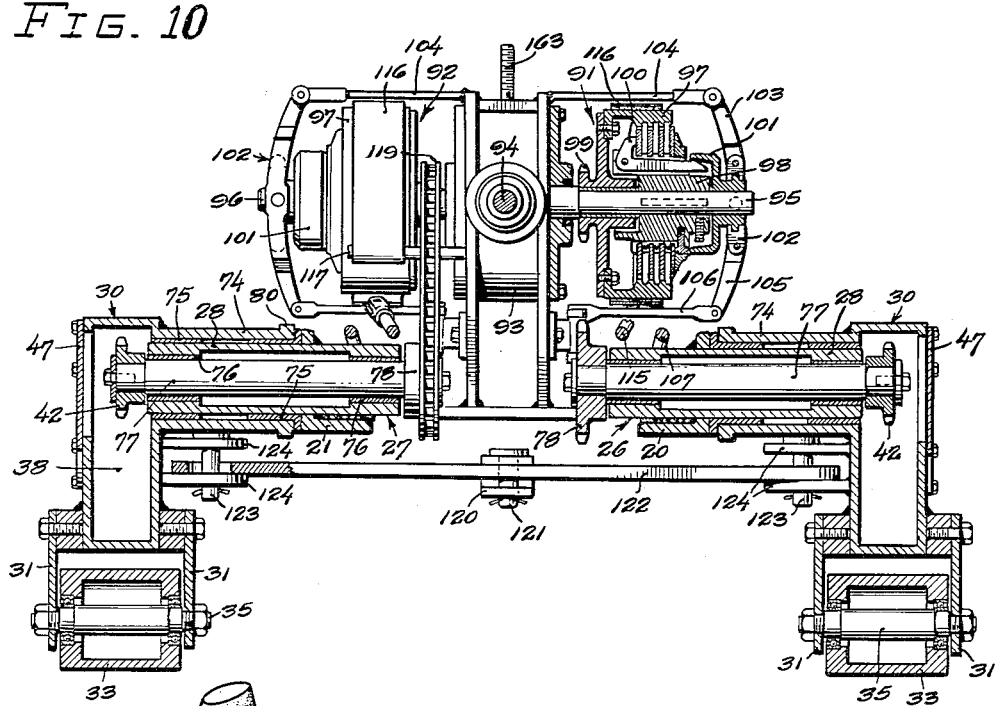
Fig. 10 is a foreshortened transverse vertical sectional view taken on line 10—10 of Fig. 2 in part through the center line of the jack-shafts and in part through the center line of two selectively activated clutches incorporated in the power-transmission system.
Figure 11:
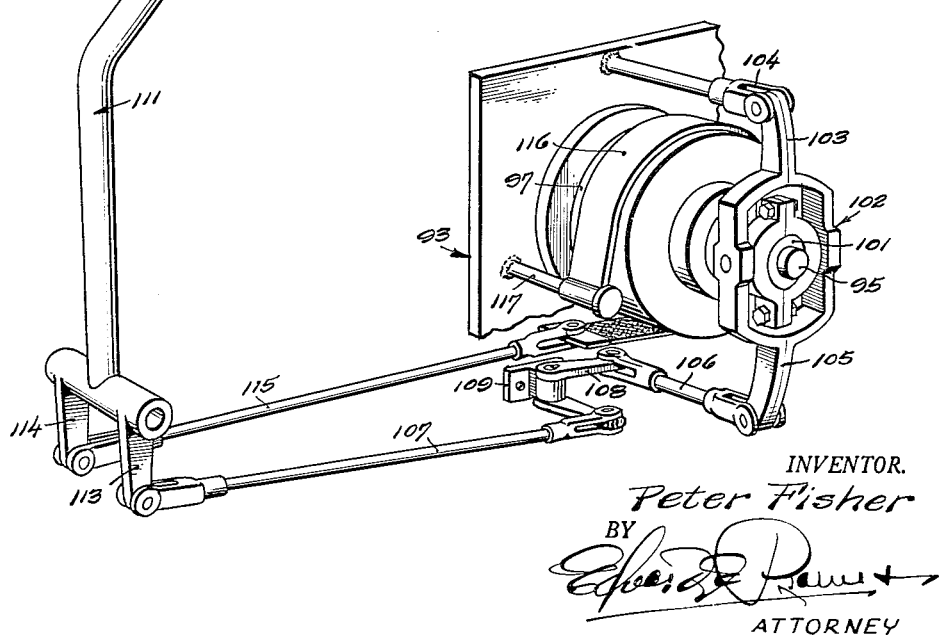
Fig. 11 is a fragmentary perspective view portraying the hand-operated control hook-up to the clutches and associated brakes.

Fig. 12 is a fragmentary transverse vertical sectional view illustrating a modified stabilizing connection between the main frame and the crawler frames and which is in several respects superior to the hook-up shown in the preceding views and detailed in Fig. 7 and is hence my now preferred arrangement. The section line is indicated by 12—12 in Fig. 13. This view, in its portrayal of the crawler frame, also incorporates a showing of structural features, detailed in the following view, which are embodied in the production models of the tractor but which have been deleted from the preceding views in order to simplify the illustration.

Fig. 13 is a fragmentary longitudinal vertical sectional view on line 13—13 of Fig. 12.

Fig. 14 is a fragmentary transverse vertical sectional view on broken line 14—14 of Fig. 13; and Fig. 15 is a fragmentary transverse vertical sectional view on line 15—15 of Fig. 12.

According to the present invention there are provided two wheel-and-track frames, hereinafter termed the swing frames, located at opposite sides of a main frame which carries the power plant for the tractor together with devices for controlling the transmission of power.

The main frame is composed of longitudinal angle-bar side principals denoted by the numerals 20 and 21 connected at spaced intervals of the length by transverse bars. Only two of these transverse bars need be particularly considered and these two bars, designated by 22 and 23, extend parallel to one another in spaced proximity and occupy a position forwardly removed beyond transverse pivot bearings, hereinafter described, for the swing frames. Attachments for the front and rear ends of the main frame, and which likewise will be hereinafter described, are arranged to be secured in place by bolts, as 24 and 25, received through bolt-holes provided in the angle-bar principals 20 and 21. The said pivot bearings comprise tube sections 26 and 27 welded or otherwise integrally joined one to one and the other to the other of the two angle-bar principals to occupy positions more or less central to the length of the main frame, and these tube sections project by their ends inwardly and outwardly beyond said principals. The protruding outer ends 28 of such tube sections give pivotal support to the swing frames and will be hereinafter referred to as pivot arms.

As to the swing frames, each said frame provides a hollow box-like body 30 of relatively extended length skirted along the sides by pendant cheek-plates 31 which extend fore and aft from center for a portion only of the length. A set of rollers, indicated as being three in number and designated by 32, 33 and 34, are journal-mounted between these cheek-plates for free rotation about respective transverse stub-axles 35. The box body is divided by partitioning walls 36 and 37 into three separate compartments 38, 39 and 40. The rearmost compartment 38 extends forwardly somewhat beyond center and serves as an oil-tight housing for a drive chain 41 passing about driving and driven sprocket wheels 42 and 43, respectively, the driven sprocket wheel, which lies to the rear, being fast to a transverse live axle 44 receiving a rotary journal at the inner side of the box body in a bearing hub 45 and at the outer side of the box body in the center hub of a boltably attached plate 46 serving as the closure for an access opening. A cover plate 47, likewise bolted to the outer wall of the box body, closes an access opening to the front end of said compartment 38. The two ends of said live axle protrude laterally beyond the bearing hubs and have a respective track-driving sprocket wheel, as 50 and 51, keyed thereto.

At the other or front end of each of said swing frames, and lying in substantial horizontal alignment with the rotary axis of said live axle, there is presented a re-entrant parallel-sided horizontal slot 52, and journaled within this slot for slide movement longitudinally of the swing frame is a cross-head 53 from which a longitudinally extending threaded tongue-bolt 54 projects rearwardly into the compartment 39 through co-axial openings provided in the end wall 55 of the slot and the partitioning wall 37. Threaded onto the rear-end of the tongue-bolt is a spring retainer 56 backed by a nut 57, and complementing this nut is a jam-nut with which there is integrated a sleeve 58 having, within its length, a circumscribing flange 59. The flange of the sleeve lies to the rear of the partitioning wall 37 and by its engagement against this wall serves as a stop for limiting the degree to which the crawler track is tensioned by force of a spring 60. Said spring, exerting thrust upon the retainer 56, takes its purchase from a second spring retainer 61 localized by a bolt 62 threading into the partitioning wall 36 and held secure by a jam-nut 63. The cross-head 53 is lipped at each end and presents a transverse centerbore fitted with end bushings 64, and journaled for free rotation in this bushing is a front axle 65. As with the live rear axle 44, the front axle protrudes by each of its ends beyond the side-edge limits of the box body and has a respective track-engaging sprocket wheel, as 66 and 67, keyed to these protruding ends. The track which I employ is composed of an endless chain of interconnecting crawler-links. Each said link is a substantial block casting presenting spaced longitudinally extending cheek sections 68 connected across the top by a table section 69, and with the side edges of the table section being prolonged laterally beyond the cheek sections. From this channel-shaped body part of the link two spaced tongues 70 extend rearwardly, being each inset from the related cheek section in a degree sufficient to admit of a lapping fit within the channel opening of a following link. Gudgeon-like bosses 71 provided upon the outside of the block at the front end thereof accommodate pivot pins 72 which pass through registering apertures formed in the free ends of the tongues. Designated by 73, an upstanding traction cleat is made an integral part of the block and extends transverse to the table section 69 on a plane taken through the pivot axis normal to the general plane occupied by the block. When applied to the paired sets of sprocket wheels, 50—51 and 66—67, the cheek sections of the blocks lie to the inside of the wheels, with the bosses 71 lodging in the interstices which occur between successive pairs of sprocket teeth. The fact of the traction cleats being disposed in a transverse vertical plane taken normal to the general plane of the link through the axis of the pivot pin minimizes any tendency of the link to rock about its pivot as the cleat digs into the ground.

To establish the pivotal mounting between the swing frames and the pivot arms 28, there protrudes inwardly from each swing frame at a point central, or approximately central, to the length thereof a hollow cylindrical neck 74 which communicates with the interior of the compartment 38. Stiffening gussets 79 reinforce these necks. The neck is provided internally at each of its two ends with bushings 75 which find a journal fit upon a related pivot arm, and the tube sections 26 and 27 which include said pivot arms are themselves internally fitted with bushings 76 to give a rotary journal for a jack-shaft 77 one end of which extends into the compartment 38 and the other end of which is exposed beyond the inner end of the tube section. The driving sprocket wheel 42 for the housed chain 41 is fixedly mounted upon the outer end and a chain-driven sprocket wheel 78 is fixedly mounted upon the inner end of said jack-shaft. To hold the neck 74 and the pivot arm on which it is sleeved against relative endwise movement, the neck presents a surrounding flange 80 upon its inner end, and this flange, with suitable brasses 81 and 82, is caught under overhanging lips of two lugs 83 which are bolted to the main frame fore and aft of the pivot arm.

As a complement to the pivot bearing, additional support is obtained by a transversely disposed walking-beam 84 pivoted to the main frame and shackled by its ends to the swing frames. This walking-beam is received between the transverse bars 22 and 23 of the main frame with the pivot pin 85 therefor being received through aligned openings in these bars so placed as to lie on the longitudinal median line of the main frame. The walking-beam, in the form in which it is illustrated in Figs. 1, 2, 3 and 9, is given much the shape of an inverted oxbow with the depressed center portion fitting between the transverse frame bars 22 and 23. Connecting by a ball-and-socket joint with each end of this beam is a respective vertical link 86 which connects by its other end, also through a ball-and-socket joint, with an ear 87 welded to a related swing-frame. As will, it is believed, be apparent, the walking-beam arrangement acts to stabilize the main frame, which is principally supported by the pivot bearings, and to divide the relative movement between the two swing-frames. A somewhat modified structure for establishing a connection from the walking-beam to the swing-frames and which I consider to be an even more advantageous arrangement than that here described is shown in Figs. 12–14 and will be later described.

Reverting to the main frame, an engine 88 serving as the power plant for the tractor is supported at the front end thereof, and mounted to the immediate rear of the engine is a change-speed transmission 89 controlled by the usual shift lever 90. Also supported upon the main frame and occupying a position at the rear end thereof is a power-transmitting assembly comprised of two clutch units 91 and 92 placed one at one side and the other at the other side of a gear box 93. Intermeshing spiral bevel gears housed in the gear box and powered by a drive shaft 94 working off the output end of the change-gear transmission carry the drive to a transverse driven shaft whose ends 95 and 96 project laterally in opposite directions from the gear box. Each of said clutch units is of the dry type employing sets of friction discs alternately splined to a surrounding drum 97 journal-mounted upon a related end of the driven shaft and to a hub 98 keyed to the related shaft end, and made rigid with a respective said drum to occupy a position alongside the gear box is a sprocket wheel 99. Clutching and de-clutching operation of said friction discs is accomplished by pressure fingers 100 activated by a shipping spool 101 received upon the end extremity of the driven shaft, and a shipping yoke 102 is provided to control the movement of said shipping spool. The shipping yoke has arm prolongations extending top and bottom from diametrically opposite sides and one said arm, designated by 103, takes a pivot mounting from an outrigger rod 104 rigid with the gear box, while the other arm 105 is linked to a hand lever by rods 106—107 and an intervening bell-crank 108, the bell-crank being pivotally supported by a frame-carried pillow block 109. There are two said hand-levers, designated by 110 and 111, one for a respective said clutch, and each said hand-lever is of the first order fulcrumed intermediate its ends upon a frame-carried transverse shaft 112 to occupy a position alongside the change-gear transmission in much the same transverse vertical plane occupied by the shift-lever 90. Each said hand-lever presents two pendant power arms 113 and 114, and the former of these arms connects through the described linkage with the related shipping yoke. The latter said arm connects by a rod 115 with the free end of a brake band 116 which is wrapped about the related clutch and has its other end anchored to a pin 117 rigid with the gear box 93. The manner in which said hand lever is connected both to the brake and to the clutch-controlling shipping yoke is such that movement of the hand lever in a forward direction first frees the clutch drum of the braking restraint of the band 116 and then draws the clutching discs into frictional engagement, converse movement of the hand-lever first disengaging the clutch and then setting the brake. A respective chain, as 118 and 119, carries the drive forwardly from each of said clutch-controlled sprocket wheels 99 to a related one of the two sprocket wheels 78 which are fast to the inner ends of the jack-shafts 77.

The tractor incorporates a towing draw-bar 120, and it is a feature of the invention that no loading stresses to which this draw-bar is subject are transferred to the jack-shafts, the latter floating freely in bearings inside the main frame pivots. To this end the draw-bar is attached to the swing-frames rather than to the main frame, being made much in the nature of a single-tree with the forked front end swingably connected by a pin 121 to a cross-piece 122 which extends between and is connected by pins 123 to apertured ears 124 extending inwardly as integral adjuncts of the swing-frames. The holes for both the pin 121 and the pins 123 are each oversize to give a sloppy fit to the connections. The tail end of the draw-bar is likewise forked, with the fork-arms apertured to accommodate a hitch-pin 125, and forwardly of the tail fork there is presented a horizontal slot 126 which accommodates a cross-bar attachment 127 serving to elevate the rear end of the draw bar off the ground, this cross-bar having upstanding flanges at the two sides secured to the main frame by the bolts 25.

Embodied in my tractor is a removable cover for the power-transmitting drive shaft, gear box, clutches, and transfer chains of my power-transmission assembly. This cover is comprised of an open-bottom box body 161 having a substantial T-shaped plan configuration. The cross portion of the T lies to the rear end and houses the gear box and clutches while the leg of the T extends forwardly somewhat beyond the shift lever 90 and houses the drive shaft 94 and the two transfer chains 118 and 119. Adjacent the front and rear ends of the cover, and placed on the substantial longitudinal median line thereof, openings are provided through the top wall. The front opening 162 allows the shift-lever to project therethrough, and the rear opening fits over an upstanding bolt 163 rigid with the gear-box. A knurled nut 164 working on the protruding end of this bolt holds the cover firmly in place. A seat 165 for the driver surmounts the cover, connecting at the front end by a pivot pin 166 and bearing at the rear end upon a coil spring 167 held under compression by a bolt 168. While not illustrated in the drawings a pan is provided below the power-transmission assembly of the tractor.

I revert now to the modification hereinbefore referred to, and namely the modified hook-up between the walking-beam and the swing-frames. Illustrated in Figs. 12–14, the beam is in this instance designated by 170 and is made substantially straight. This perforce locates the laterally projecting ends of the beam in the same plane as that occupied by the framing side principals 20 and 21, and to accommodate said beam ends the vertical flanges of the two principals each present a vertical slot 171 located in the transverse plane of the beam. In compensation of the cut-out slots, a bridging plate 172 is welded in surmounting relation upon the flange and is reinforced upon the inside by an inverted-V web 173. The beam is forked at each end to present a respective outwardly opening horizontal slot 174, and engaged in each said slot is a roller 175 journal-mounted for rotation between companion longitudinally spaced lugs 176 rigid with the swing-frames. A spanner plate 177 extends across the lugs in overlying relation to the introduced end of the beam. The rollers are bellied in compensation of the oscillatory motion of the frames 30 as they swing about their pivot centers. The principal advantage of the stabilizing arrangement here described is the fact that the beam ends and their swing-frame connections are entirely confined between the upper and lower runs of the crawler tracks. This permits wider tracks to be used without increasing the overall width of the tractor in that the inner-edge limit of said track can be brought into very close proximity of the main frame and which is perforce precluded where the employed hook-up includes any outlying rigging so applied as to extend from a position inside to a position outside the boundaries of the crawler track.

From an inspection of Figs. 12–14, and also Fig. 15, it will be noted that the illustration of the swing-frames departs somewhat from that shown in the preceding views. In these latter views the lugs 176, and also a neck 180 which is the functioning equivalent of the neck 74 and finds a pivotal mounting upon the outjutting tubular stud 28 of the main frame, are not integrated with the swing-frame but rather are made an integral part of a cheek-plate 181 bolted to the inner face of the swing-frame. A plurality of strategically distributed bolts are employed, and each of such bolts extends through a longitudinal slot formed in the cheek-plate, thus to enable the cheek-plate to be adjusted longitudinally of the swing-frame. By this adjustment I provide a take-up on the drive chain 41 housed within the swing-frame. The inside wall of the swing-frame against which said cheek-plate is bolted presents an opening 182 to accommodate the jack-shaft 77. Such opening is oblong with the minor axis disposed vertically, and the width along this minor axis is sufficient to admit of the free passage of the driving sprocket wheel 42 through the opening. Consequently, by the simple instrumentality of jacking up a related side of the main frame, removing the clamping nuts which bolt the cheek-plate to the swing-frame, and disengaging the transfer chain 41 from the sprocket wheel 42, the entire swing-frame may be bodily removed as a unit. This permits the tractor to be conveniently knocked down for shipping and is also advantageous from the standpoint of servicing ease. The bolts for adjustably securing said cheek-plate to the swing-frame are indicated as being six in number. Five of these bolts, each designated by 183, are free headed bolts which extend through sleeves 184 welded as spreaders between the side walls of the swing-frame, the remaining bolt, designated by 185, being welded to the near wall of the swing-frame. The position in which this bolt 185 is placed precludes use of a through-bolt in that the axial line lies within the compass of the transfer chain 41 and would interfere with free introduction and removal of the transfer chain.

It is thought that the manner of operation of my tractor and the inherent advantages will have been clearly understood from the foregoing detailed description of my now preferred embodiment, but it is self-evident that minor changes in details of construction may be resorted to without departing from the spirit of the invention and I therefore intend that the hereto annexed claims be read with the broadest interpretation which the employed language fairly permits.

What I claim is:

1. In a tractor, in combination with a main frame presenting rigid hollow pivot arms projecting laterally from opposite sides thereof on a common transverse horizontal axis located more or less central to the length of said frame, crawler frames having inwardly directed cylindrical neck elements made rigid with the crawler frames to lie midway of the ends thereof and finding a pivoting sleeve fit with the pivot arms, a respective jack-shaft extending axially through said arm-and-neck pivot assemblies and receiving a rotary journal therein, a cross-member laterally connecting the sides of the main frame forwardly of the pivot arms, and a stabilizing means interconnecting the cross-member and the crawler frames and operating by relative oscillatory motion as between the two crawler frames to impart a mean of said relative movement to the main frame, said stabilizing means comprising a walking beam in the form of an inverted ox-bow and pivoted to the cross-member at the longitudinal median line of the main frame, and a vertical link interconnecting each end of the walking beam with the adjacent crawler frame, said link being rotatably movable on the crawler frame and on the end of the walking beam.

2. Structure according to claim 1 wherein said vertical link connects by a ball and socket joint to the walking beam and by a ball and socket joint to the crawler frame.

3. In a tractor, in combination with a main frame presenting rigid hollow pivot arms projecting laterally from opposite sides thereof on a common transverse horizontal axis located more or less central to the length of said frame, crawler frames having inwardly directed cylindrical neck elements made rigid with the crawler frames to lie midway of the ends thereof and finding a pivoting sleeve fit with the pivot arms, a respective jackshaft extending axially through said arm-and-neck pivot assemblies and receiving a rotary journal therein, a cross-member laterally connecting the sides of the main frame forwardly of the pivot arms, and a stabilizing means interconnecting the cross-member and the crawler frames and operating by relative oscillatory motion as between the two crawler frames to impart a mean of said relative movement to the main frame, said stabilizing means comprising a walking beam pivoted to the cross-member at the longitudinal median line of the main frame and extending by its ends through respective openings in the sides of the main frame, said ends of the beam being forked whereby each presents an outwardly opening slot, and a roller journal mounted horizontally on the inward side of each crawler frame to extend longitudinally thereof and fitting into the slot at the respective end of the beam.

4. The structure of claim 3 wherein each of said rollers is bellied.

References Cited in the file of this patent

UNITED STATES PATENTS

| | | |
|---|---|---|
| 1,196,119 | Krupp | Aug. 29, 1916 |
| 1,229,462 | Houghton | June 12, 1917 |
| 1,238,702 | Welch | Aug. 28, 1917 |
| 1,258,602 | Turnbull | Mar. 5, 1918 |
| 1,295,242 | Waite | Feb. 25, 1919 |
| 1,298,002 | Dickerson | Mar. 25, 1919 |
| 1,299,937 | Hatfield | Apr. 8, 1919 |
| 1,305,506 | Townsend | June 3, 1919 |
| 1,309,053 | Adams | July 8, 1919 |
| 1,388,750 | Palmer | Aug. 23, 1921 |
| 1,581,648 | Leake | Apr. 20, 1926 |
| 1,720,553 | Jett | July 9, 1929 |
| 1,751,394 | Christie | Mar. 18, 1930 |
| 1,985,777 | Hamilton | Dec. 25, 1934 |
| 2,034,125 | Wickersham | Mar. 17, 1936 |
| 2,095,559 | Starr et al. | Oct. 12, 1937 |
| 2,125,522 | Schmidt | Aug. 2, 1938 |
| 2,157,711 | Lamb | May 9, 1939 |
| 2,197,248 | Bonham et al. | Apr. 16, 1940 |
| 2,223,802 | Heaslet | Dec. 3, 1940 |
| 2,307,655 | Arps | Jan. 5, 1943 |
| 2,356,600 | Lentz | Aug. 22, 1944 |
| 2,406,230 | Lill | Aug. 20, 1946 |
| 2,421,472 | Way | June 3, 1947 |
| 2,434,693 | Graham | Jan. 20, 1948 |
| 2,440,518 | Lewis et al. | Apr. 27, 1948 |
| 2,483,961 | Ball | Oct. 4, 1949 |
| 2,572,911 | Brown | Oct. 30, 1951 |
| 2,641,343 | Bennett | June 9, 1953 |